United States Patent
Peng et al.

(10) Patent No.: US 11,009,707 B2
(45) Date of Patent: May 18, 2021

(54) OPTICAL SYSTEMS FOR ELECTRONIC DEVICES WITH DISPLAYS

(71) Applicant: Apple Inc., Cupertino, CA (US)

(72) Inventors: Guolin Peng, Santa Clara, CA (US); Hyungryul Choi, San Jose, CA (US); Scott M. DeLapp, Sunnyvale, CA (US); Tyler G. Anderson, Sunnyvale, CA (US)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 16/610,841

(22) PCT Filed: May 11, 2018

(86) PCT No.: PCT/US2018/032445
§ 371 (c)(1),
(2) Date: Nov. 4, 2019

(87) PCT Pub. No.: WO2018/226367
PCT Pub. Date: Dec. 13, 2018

(65) Prior Publication Data
US 2020/0159020 A1    May 21, 2020

Related U.S. Application Data

(60) Provisional application No. 62/516,014, filed on Jun. 6, 2017.

(51) Int. Cl.
*G02B 27/01* (2006.01)
*F21V 8/00* (2006.01)

(52) U.S. Cl.
CPC ......... *G02B 27/0172* (2013.01); *G02B 6/003* (2013.01); *G02B 6/0016* (2013.01);
(Continued)

(58) Field of Classification Search
CPC .... G02B 6/0016; G02B 6/003; G02B 6/0038; G02B 27/0172; G02B 2027/011; G02B 2027/0178
See application file for complete search history.

(56) References Cited

U.S. PATENT DOCUMENTS

| 5,619,373 A | 4/1997 | Meyerhofer et al. |
| 5,926,318 A | 7/1999 | Hebert |

(Continued)

FOREIGN PATENT DOCUMENTS

| CN | 100410727 C | 8/2008 |
| CN | 105593745 A | 5/2016 |

(Continued)

*Primary Examiner* — Daniel Petkovsek
(74) *Attorney, Agent, or Firm* — Treyz Law Group, P.C.; G. Victor Treyz; Joseph F. Guihan

(57) ABSTRACT

An electronic device may have a pixel array. A light source may illuminate the pixel array to produce image light. The image light may pass through a multi-element lens and may be coupled into a waveguide using an input coupler such as a prism. An output coupler such as a diffraction grating may couple the image light out of the waveguide and towards a user. The user may view the image light and may observe real-world objects through the waveguide. The waveguide may have locally modified portions that define an aperture stop at a distance from an exit surface of the multi-element lens. The multi-element lens may have first and second achromatic doublets and first and second singlets between the first and second achromatic doublets. The lens elements of the multi-element lens may include lens elements with aspheric surfaces.

8 Claims, 5 Drawing Sheets

(52) U.S. Cl.
CPC ......... *G02B 6/0018* (2013.01); *G02B 6/0035* (2013.01); *G02B 6/0038* (2013.01); *G02B 2027/011* (2013.01); *G02B 2027/0178* (2013.01)

(56) References Cited

U.S. PATENT DOCUMENTS

| | | | |
|---|---|---|---|
| 6,271,808 B1 | 8/2001 | Corbin | |
| 6,441,971 B2 | 8/2002 | Ning | |
| 6,825,987 B2* | 11/2004 | Repetto | G02B 27/0172 345/6 |
| 7,418,170 B2* | 8/2008 | Mukawa | G02B 27/0172 385/31 |
| 7,542,209 B2 | 6/2009 | McGuire | |
| 9,366,864 B1* | 6/2016 | Brown | G02B 6/005 |
| 9,753,286 B2* | 9/2017 | Gao | G02B 27/0172 |
| 9,835,865 B2* | 12/2017 | Inagaki | G02B 27/283 |
| 10,175,486 B2* | 1/2019 | Watanabe | G02B 3/06 |
| 10,520,731 B2* | 12/2019 | Amitai | G02B 6/34 |
| 2001/0033401 A1* | 10/2001 | Kasai | G02B 27/0172 359/15 |
| 2003/0020006 A1* | 1/2003 | Janeczko | G02B 27/4211 250/216 |
| 2007/0188837 A1 | 8/2007 | Shimizu et al. | |
| 2010/0277803 A1 | 11/2010 | Pockett et al. | |
| 2012/0306940 A1* | 12/2012 | Machida | G09G 3/3406 345/690 |
| 2014/0140653 A1 | 5/2014 | Brown et al. | |
| 2016/0363769 A1 | 12/2016 | Masuda et al. | |

FOREIGN PATENT DOCUMENTS

| | | |
|---|---|---|
| EP | 1385023 A1 | 1/2004 |
| JP | 2003043352 A | 2/2003 |
| JP | 3445404 B2 | 9/2003 |
| JP | 2004157520 A | 6/2004 |
| JP | 2014109717 A | 6/2014 |
| JP | 2014170094 A | 9/2014 |
| JP | 2015169887 A | 9/2015 |
| JP | 2015172624 A | 10/2015 |
| WO | 2015050194 A1 | 4/2015 |

* cited by examiner

OPTICAL SYSTEMS FOR ELECTRONIC DEVICES WITH DISPLAYS

This application claims priority to provisional patent application No. 62/516,014, filed on Jun. 6, 2017, which is hereby incorporated by reference herein in its entirety.

BACKGROUND

This relates generally to electronic devices and, more particularly, to electronic devices with displays.

Electronic devices often include displays. For example, a head-mounted device such as a pair of virtual reality or mixed reality glasses may have a display for displaying images for a user. An optical system can be used to direct image light from the display to the eyes of a user.

The process of using an optical system to provide images from a display to the eyes of a user in a head-mounted device has the potential to introduce image distortion. Challenges may also arise in forming an optical system that is sufficiently compact to wear on the head of a user. If care is not taken, an optical system for an electronic device may be overly bulky and may not exhibit satisfactory optical performance.

SUMMARY

An electronic device such as a head-mounted device may have a pixel array. A light source may illuminate the pixel array to produce image light. When illuminating the pixel array, light from the light source may pass through a prism. Reflected image light may pass through the prism to a multi-element lens.

The image light may pass through the multi-element lens and may be coupled into a waveguide using an input coupler such as a prism. An output coupler such as a diffraction grating may couple the image light out of the waveguide and towards a user. The user may view the image light and may simultaneously observe real-world objects through the waveguide.

The waveguide may have a thickness and may have locally modified lateral portions that define an aperture stop at a distance from the exit surface of the multi-element lens. The multi-element lens may have first and second achromatic doublets and first and second singlets between the first and second achromatic doublets. The lens elements of the multi-element lens may include lens elements with aspheric surfaces.

DETAILED DESCRIPTION

Head-mounted devices and other electronic devices may be used for virtual reality and mixed reality (augmented reality) systems. These devices may include portable consumer electronics (e.g., portable electronic devices such as cellular telephones, tablet computers, glasses, other wearable equipment), head-up displays in cockpits, vehicles, etc., display-based equipment (projectors, televisions, etc.). Devices such as these may include displays and other optical components. Device configurations in which virtual reality and/or mixed reality content is provided to a user (viewer) with a head-mounted display device are described herein as an example. This is, however, merely illustrative. Any suitable equipment may be used in providing a user with visual content such as virtual reality and/or mixed reality content.

A head-mounted device such as a pair of augmented reality glasses that is worn on the head of a user may be used to provide a user with computer-generated content that is overlaid on top of real-world content. The real-world content may be viewed directly by a user through a transparent portion of an optical system. The optical system may be used to route images from one or more pixel arrays in a display system to the eyes of a user. A waveguide such as a thin planar waveguide formed from a sheet of transparent material such as glass or plastic or other light guide may be included in the optical system to convey image light from the pixel arrays to the user. The display system may include reflective displays such as liquid-crystal-on-silicon displays, microelectromechanical systems (MEMs) displays, or other displays.

Figure 1:
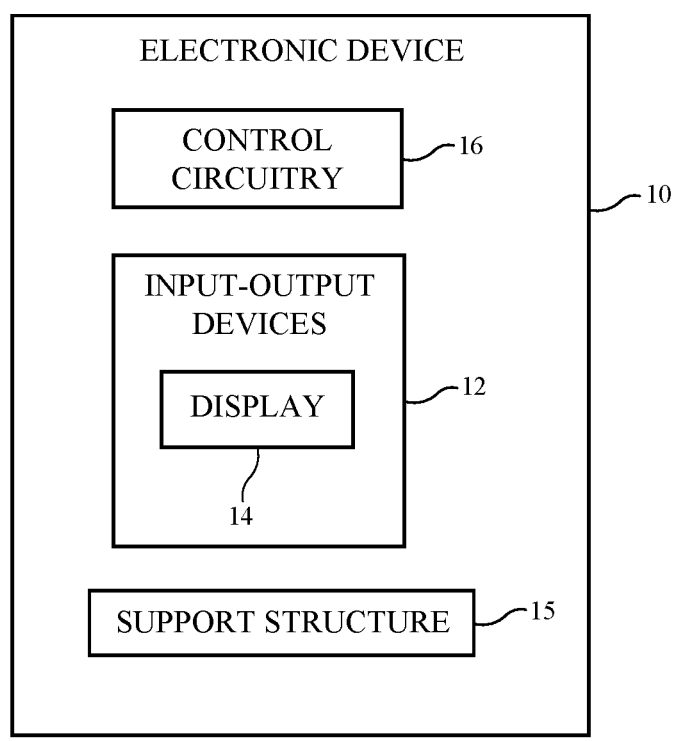
FIG. 1 is a diagram of an illustrative electronic device having a display in accordance with an embodiment.

A schematic diagram of an illustrative electronic device such as a head-mounted device is shown in FIG. 1. As shown in FIG. 1, head-mounted device 10 may have a head-mountable support structure such as support structure 15. The components of head-mounted display 10 may be supported by support structure 15. Support structure 15, which may sometimes be referred to as a housing, may be configured to form a frame of a pair of glasses (e.g., left and right temples and other frame members), may be configured to form a helmet, may be configured to form a pair of goggles, or may have other head-mountable configurations.

The operation of device 10 may be controlled using control circuitry 16. Control circuitry 16 may include storage and processing circuitry for controlling the operation of head-mounted display 10. Circuitry 16 may include storage such as hard disk drive storage, nonvolatile memory (e.g., electrically-programmable-read-only memory configured to form a solid state drive), volatile memory (e.g., static or dynamic random-access-memory), etc. Processing circuitry in control circuitry 16 may be based on one or more microprocessors, microcontrollers, digital signal processors, baseband processors, power management units, audio chips, graphics processing units, application specific integrated circuits, and other integrated circuits. Software code may be stored on storage in circuitry 16 and run on processing circuitry in circuitry 16 to implement operations for head-mounted display 10 (e.g., data gathering operations, operations involving the adjustment of components using control signals, image rendering operations to produce image content to be displayed for a user, etc.).

Head-mounted device 10 may include input-output circuitry such as input-output devices 12. Input-output devices 12 may be used to allow data to be received by head-mounted display 10 from external equipment (e.g., a tethered computer, a portable device such as a handheld device or laptop computer, or other electrical equipment) and to allow a user to provide head-mounted device 10 with user input. Input-output devices 12 may also be used to gather information on the environment in which head-mounted device 10 is operating. Output components in devices 12 may allow head-mounted device 10 to provide a user with output and may be used to communicate with external electrical equipment.

As shown in FIG. 1, input-output devices 12 may include one or more displays such as display(s) 14. Display(s) 14 may be used to display images for a user of head-mounted device 10. Display(s) 14 have pixel array(s) to generate images that are presented to a user through an optical system. The optical system may include optical components such as waveguides, optical couplers, and lenses. The optical system may have a transparent portion through which the user (viewer) can observe real-world objects while computer-generated content is overlaid on top of the real-world objects by producing computer-generated images on the display(s) 14.

Figure 2:
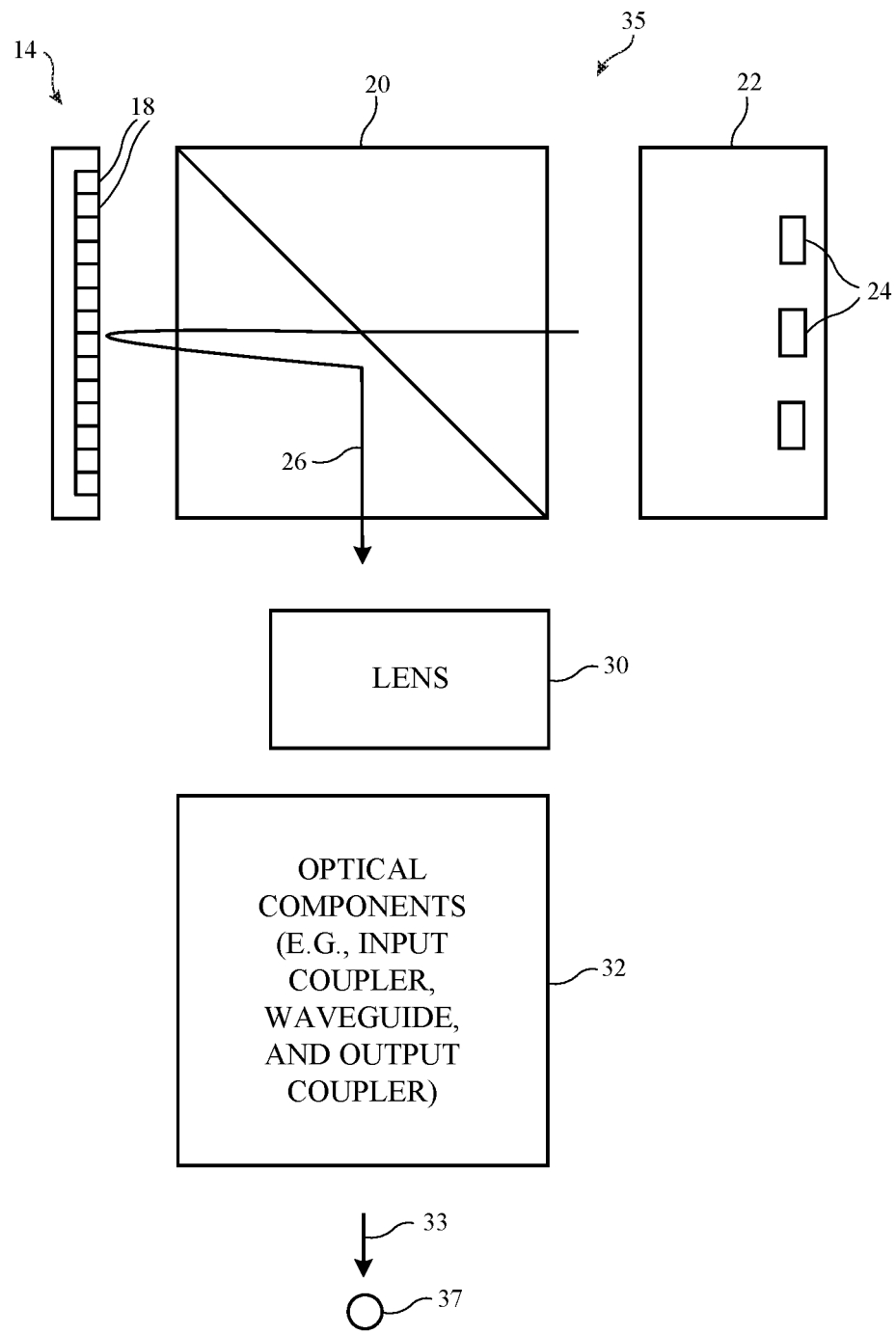
FIG. 2 is a diagram of an illustrative optical system that provides image light from a display to a user in accordance with an embodiment.

FIG. 2 is a diagram of an illustrative optical system for presenting images on display 14 to the eye(s) of user 37. As shown in FIG. 2, system 35 may include an illumination source such as light source 22. Light source 22 may have one or more light-emitting components 24 for producing output light. Light-emitting components 24 may be, for example, light-emitting diodes (e.g., red, green, and blue light-emitting diodes, white light-emitting diodes, and/or light-emitting diodes of other colors). Illumination may also be provided using light sources such as lasers or lamps.

The displays in device 10 such as illustrative display 14 may be reflective displays such as liquid-crystal-on-silicon displays, microelectromechanical systems (MEMs) displays (sometimes referred to as digital micromirror devices), or other displays. An optical component such as prism 20 may be interposed between light source 22 and pixel array 18 of display 14. As illustrated by light ray 26, prism 20 may be used to couple illumination from light source 22 to display 14 and may be used to couple reflected image light from pixel array 18 of display 14 to lens 30. Lens 30 may be used to provide image light from display 14 (e.g., reflected light 26) to optical components 32. Lens 30 may have a relatively wide field of view (e.g., at least 52°×52°, at least 52° by 30°, etc.).

Optical components 32 may include a waveguide (e.g., a waveguide formed from a transparent layer of clear glass or plastic), an input coupler for coupling image light (light 26) into the waveguide, and an output coupler for coupling the image light out of the waveguide (e.g., to produce emitted light 33 that is viewed by user 37).

Figure 3:
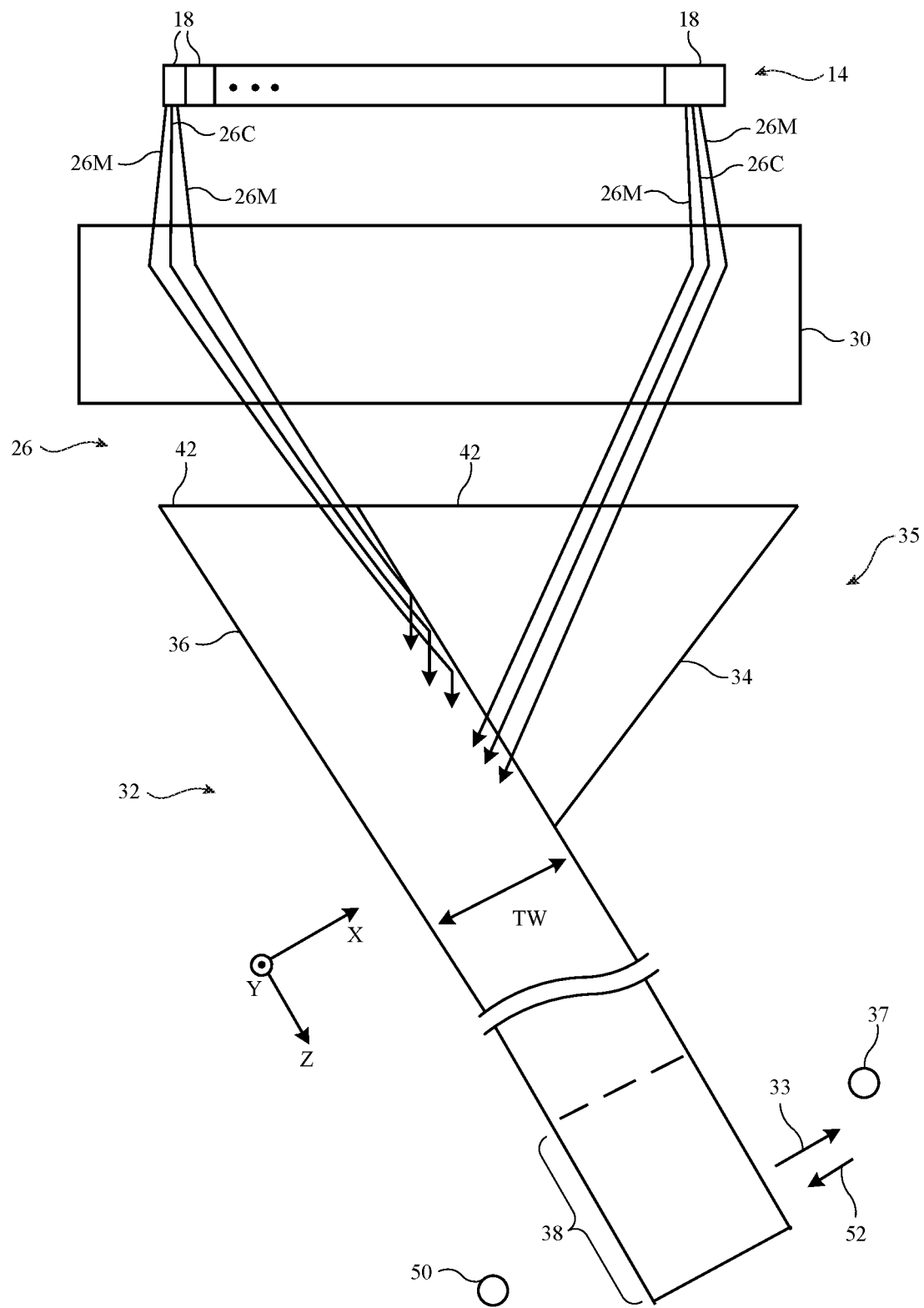
FIG. 3 is a diagram of an illustrative optical system showing how image light may be coupled into and out of a waveguide in accordance with an embodiment.

FIG. 3 is a diagram of optical system 35 of FIG. 2 in which prism 20 has been omitted for clarity. As shown in FIG. 3, the bundle of light rays reflected from each pixel 18 may be characterized by a chief ray 26C and marginal rays 26M. Chief rays 26C may be perpendicular to pixels 18 (e.g., within 1°). Lens 30 may be telecentric (configured to accept telecentric light rays). Upon passing through lens 30, the bundle of light rays from each pixel may be collimated. With one illustrative configuration for optical system 35, the marginal and chief rays for any given pixel 18 in display 14 will vary in angular orientation by less than 0.5 arc min.

Upon exiting lens 30, light rays 26 may be coupled into waveguide 36 using an input coupler such as prism 34. As shown in FIG. 3, light rays 26 may, for example, enter surface 40 of waveguide 36 and coplanar surface 42 of prism 34 and may thereafter propagate along the length of waveguide 36 (e.g., along dimension Z in the example of FIG. 3) in accordance with the principal of total internal reflection. When the image light from display 14 that has been coupled into waveguide 36 in this way reaches output coupler 38 (e.g., a diffraction grating embedded in waveguide 36 and/or formed in a coating on the surface of waveguide 36 and/or other output coupler structures), output coupler 38 may be used to couple the image light out of waveguide 36 as emitted light 33, for viewing by user 37. If desired, waveguide 36 may be transparent, so user 37 can view real-world objects such as object 50 through waveguide 36 when looking in direction 52.

Figure 4:
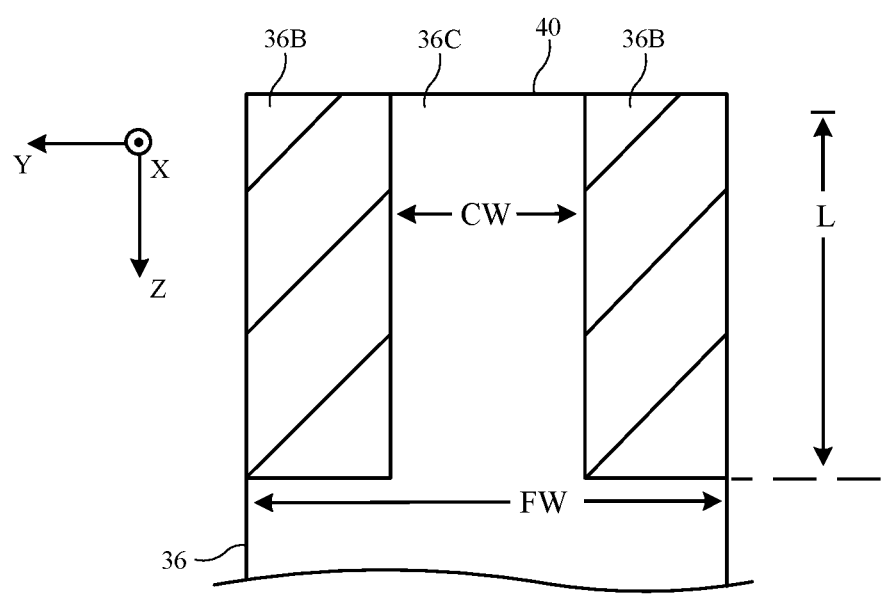
FIG. 4 is a view of an end portion of a waveguide showing how portions of the waveguide may be modified to laterally confine light to define an aperture stop in accordance with an embodiment.

The image light propagating through waveguide 36 may be confined vertically (relative to dimension X in the example of FIG. 3) by the thickness TW of waveguide 36 (e.g., 1.5 mm, 1-2 mm, at least 0.5 mm, less than 3 mm, etc.). Lateral image light confinement may be provided by locally modifying the properties of waveguide 36 (e.g., by incorporating absorbing material in selected regions of waveguide 36, by covering selected portions of waveguide 36 with a coating of light-absorbing material and/or by otherwise incorporating light-absorbing material, reflecting structures, gratings, and/or other structures into waveguide 36). As shown in FIG. 4, for example, portions 36B of waveguide 36 may include light restricting structures that block light propagation while leaving portion 36C transparent to permit light propagation. In particular, portion of the width of waveguide 36 that is used for transmitting light may be locally reduced from the full width FW of waveguide 36 (which is generally larger than thickness TW) to reduced width CW. This selective modification to waveguide 36 may therefore confine image light laterally (along lateral dimension Y in the example of FIG. 4).

Waveguide 36 may be modified in this way (including portions 36B) at the entrance to waveguide 36 (e.g., in length L of waveguide 36 adjacent to entrance surface 40). The value of L may be at least 3 mm, at least 7 mm, at least 1 cm, less than 1.5 cm, less than 5 mm, or other suitable value. The lateral confinement of light-restricting portions 36B (e.g., the width CW of transparent entrance portion 36C of waveguide 36) and the vertical confinement due to the size of thickness TW of waveguide 36 form an aperture stop for system 35. The aperture stop formed from these waveguide structures is located between the last surface of lens 30 and output coupler 38 (e.g., between lens 30 and user 37). As an example, these structures may form an aperture of about 2 mm in diameter (or at least 1 mm, at least 1.5 mm, less than 2.5 mm, less than 3 mm, etc.) at a distance of 6 mm (or at least 3 mm, at least 4 mm, at least 5 mm, less than 12 mm, less than 9 mm, etc.) from the output surface of lens 30.

Figure 5:
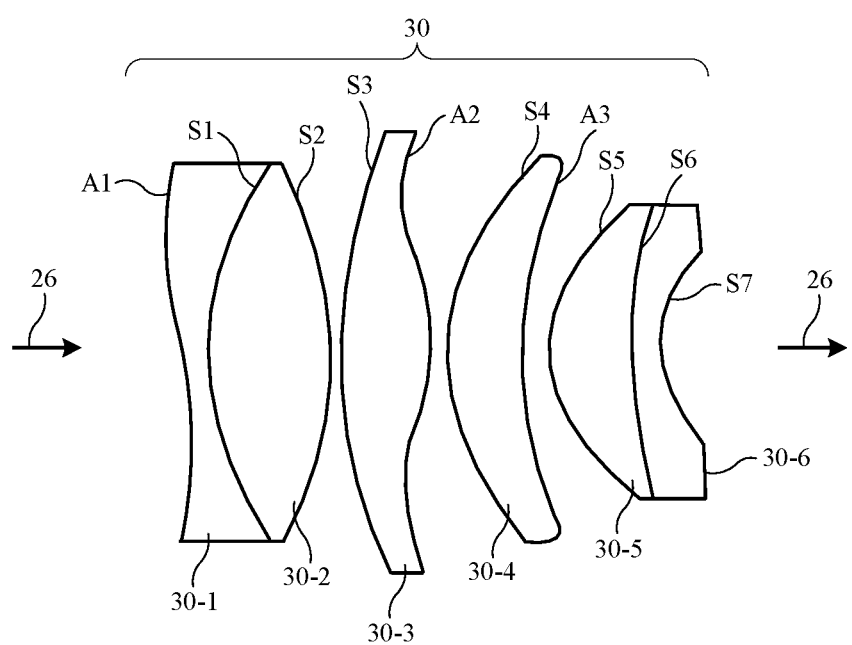
FIG. 5 is cross-sectional side view of an illustrative multi-element lens for an optical system in accordance with an embodiment.

The quality of lens 30 may be enhanced by using multiple lens elements (lenses) in lens 30 and by incorporating multiple aspheric surfaces in these lens elements. An illustrative configuration for lens 30 is shown in FIG. 5. As shown in FIG. 5, lens 30 may include an initial lens element such as lens element 30-1 with an aspheric surface A1 (e. g., the entrance surface for lens 30 that accepts image light 26). Lens element 30-1 may be a negative lens and may have a concave output surface S1. Lens element 30-1 may be attached to positive lens element 30-2 to form an achromatic doublet. The entrance surface to lens element 30-2 may be a convex surface that is matched to the concave output surface S1 of lens element 30-1. Lens element 30-2 may also have an output surface S2 that is convex. Surfaces S1 and S2 may be spherical.

At the exit of lens 30, lens 30 may have another achromatic doublet formed from lens element 30-5 and final lens element 30-6. Elements 30-5 and 30-6 are joined at surface S6. Lens element 30-5 may be a positive lens element and lens element 30-6 may be a negative lens element. Convex entrance surface S5 of lens element 30-5 and concave exit surface S7 of lens element 30-6 may be spherical. Surface S6, which forms a concave exit surface for lens element 30-5 and a matching convex input surface for lens element 30-6 may also be spherical. Surface S7 serves as the exit surface for lens 30 and may be located about 6 mm (or at least 1 mm, at least 2 mm, at least 3 mm, at least 4 mm, at least 5 mm, less than 10 mm, or other suitable distance) from the aperture stop formed from waveguide 36.

A pair of singlets such as lens element 30-3 and lens element 30-4 may be located between the entrance doublet and exit doublet of lens 30. Lens element 30-3 may be a positive lens element having spherical convex entrance surface S3 and aspheric exit surface A2. Lens element 30-4 may be a positive lens element having spherical convex entrance surface S4 and aspheric exit surface A3.

Prism 20 may be formed from SF1 glass, lens element 30-1 may be formed from SF6 glass, lens element 30-2 may be formed from N-PK51 glass, lens element 30-3 may be formed from L-BAL42 glass, lens element 30-4 may be formed from L-LAL13 glass, lens element 30-5 may be formed from H-ZPKS glass, and lens element 30-6 may be formed from N-BK10 glass. Display 14 may have a cover glass layer that covers pixels 18. The cover glass layer for display 14 may be formed from BK7 glass.

Using this type of optical arrangement for optical system 35, distortion may be less than 5% and luminance uniformity may be at least 75%. Other types of arrangements may be used for system 35, if desired. For example, lens 30 and the other optical components of system 35 may be formed from different glasses, polymers, crystalline materials, and/or other clear lens materials. If desired, different numbers of lens elements (e.g., 4-8, at least 5, at least 6, at least 7, fewer than 9, fewer than 8, fewer than 7, etc.) may be used in forming lens 30. The configurations of FIGS. 2, 3, 4, and 5 are merely illustrative.

In accordance with an embodiment, an electronic device is provided that includes a pixel array, a light source that illuminates the pixel array to produce image light, a lens having multiple lens elements including an initial lens element with an entrance surface that receives the image light and including a final lens element with an exit surface through which the image light exits, and a waveguide that receives the image light from the lens and that forms an aperture stop located at a distance from the exit surface.

In accordance with another embodiment, the electronic device includes an input coupler configured to couple the image light into the waveguide from the lens.

In accordance with another embodiment, the electronic device includes an output coupler configured to couple the image light out of the waveguide.

In accordance with another embodiment, the waveguide has a cross-sectional profile with a thickness and a width that is greater than the thickness and the waveguide includes modified portions that locally restrict the width to form the aperture stop.

In accordance with another embodiment, the input coupler includes a prism.

In accordance with another embodiment, the output coupler includes a grating.

In accordance with another embodiment, the electronic device includes a head-mounted support structure that supports the pixel array.

In accordance with another embodiment, the pixel array includes a digital micromirror device.

In accordance with another embodiment, the lens includes at least five elements.

In accordance with another embodiment, the lens includes at least two doublets.

In accordance with another embodiment, the lens elements of the lens include at least two aspheric surfaces.

In accordance with another embodiment, the lens elements include a first achromatic doublet, a second achromatic doublet, and first and second singlets between the first achromatic doublet and the second achromatic doublet.

In accordance with another embodiment, the first achromatic doublet has a negative lens element with an aspheric surface.

In accordance with another embodiment, the first singlet has an aspheric surface.

In accordance with another embodiment, the second singlet has a aspheric surface.

In accordance with an embodiment, an optical system is provided that includes a pixel array, a light source that illuminates the pixel array to produce image light, and a lens having multiple lens elements that receives the image light, the lens elements include a first achromatic doublet, a second achromatic doublet, and first and second singlets between the first achromatic doublet and the second achromatic doublet.

In accordance with another embodiment, the electronic device includes a prism, light passes from the light source to the pixel array through the prism and the image light passes through the prism to the lens.

In accordance with another embodiment, the optical system includes a waveguide that receives the image light and that has light modifying portions that define an aperture stop for the image light.

In accordance with an embodiment, a lens is provided that includes a first achromatic doublet, a second achromatic doublet, and a first and second singlets between the first achromatic doublet and the second achromatic doublet, the first achromatic doublet has a negative lens element with an aspheric surface, the first singlet has an aspheric surface, and the second singlet has a aspheric surface.

In accordance with another embodiment, the aspheric surface of the first singlet faces a spherical surface of the second singlet.

The foregoing is merely illustrative and various modifications can be made to the described embodiments. The foregoing embodiments may be implemented individually or in any combination.

What is claimed is:

1. An electronic device, comprising:
    a pixel array;
    a light source that illuminates the pixel array to produce image light;
    a lens having multiple lens elements including an initial lens element with an entrance surface that receives the image light and including a final lens element with an exit surface through which the image light exits;
    a waveguide that receives the image light from the final lens element, wherein the waveguide has a thickness, a length that is greater than the thickness, and a width that is greater than the thickness, wherein the waveguide has first and second opposing surfaces separated by the thickness, and wherein the image light is configured to propagate along the waveguide by reflecting off of the first and second opposing surfaces using total internal reflection; and
    an input coupler configured to couple the image light into the waveguide from the final lens element, wherein the input coupler is attached to the first surface of the waveguide, wherein a first portion of the image light is configured to exit the final lens element and enter the input coupler, and wherein a second portion of the image light is configured to exit the final lens element and enter the waveguide through a third surface that connects the first and second opposing surfaces.

2. The electronic device defined in claim 1 further comprising an output coupler configured to couple the image light out of the waveguide.

3. The electronic device defined in claim 2 wherein the output coupler comprises a grating.

4. The electronic device defined in claim 1 wherein the width is a first width, wherein the waveguide includes first and second light blocking portions that define an aperture stop for the image light, wherein the first and second light blocking portions are formed on the first surface of the waveguide, and wherein a second width that is smaller than the first width and parallel to the first width separates the first and second light blocking portions.

5. The electronic device defined in claim 1 wherein the input coupler comprises a prism.

6. The electronic device defined in claim 1 further comprising a head-mounted support structure that supports the pixel array.

7. The electronic device defined in claim 1 wherein the pixel array comprises a digital micromirror device.

8. The electronic device defined in claim 1 wherein the lens elements include:
- a first achromatic doublet, wherein the first achromatic doublet includes the initial lens element;
- a second achromatic doublet, wherein the second achromatic doublet includes the final lens element; and
- first and second singlets between the first achromatic doublet and the second achromatic doublet, wherein the first singlet has a first aspheric surface, wherein the second singlet has a second aspheric surface, wherein the initial lens element is a negative lens element, and wherein the entrance surface of the initial lens element is a third aspheric surface.

* * * * *